United States Patent
Chen et al.

(10) Patent No.: US 11,751,512 B2
(45) Date of Patent: Sep. 12, 2023

(54) WOODY ROOTSTOCK FOR EFFICIENT GRAFTING OF SOLANACEOUS VEGETABLES AND EFFICIENT GRAFTING AND SEEDLING CULTURE METHOD THEREOF

(71) Applicant: ZHEJIANG UNIVERSITY, Hangzhou (CN)

(72) Inventors: Liping Chen, Hangzhou (CN); Tingjin Wang, Hangzhou (CN); Lu Yuan, Hangzhou (CN); Ke Liu, Hangzhou (CN); Aijun Zhang, Hangzhou (CN); Yang Yang, Hangzhou (CN); Xuan Zhang, Hangzhou (CN); Yuzhuo Li, Hangzhou (CN); Zhenyu Qi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 41 days.

(21) Appl. No.: 17/497,992

(22) Filed: Oct. 11, 2021

(65) Prior Publication Data
US 2022/0022378 A1 Jan. 27, 2022

Related U.S. Application Data

(63) Continuation of application No. PCT/CN2019/103658, filed on Aug. 30, 2019.

(51) Int. Cl.
*A01H 4/00* (2006.01)
*A01G 2/35* (2018.01)

(52) U.S. Cl.
CPC .................................... *A01G 2/35* (2018.02)

(58) Field of Classification Search
CPC ......................................................... A01G 2/35
USPC .............................................................. 47/7
See application file for complete search history.

(56) References Cited

PUBLICATIONS

Huang et al. Characterization of the growth and fruit quality of tomato grafted on a woody medecinal plant *Lycium chinense* Scientia Horticulturae 197 447-453 2015.*
Qing et al. A study on the establishement of rapid propagation system and propagation techniques of high quality seedling of wolfberry (*Lycium barbarum* L. Medecinal Plant 3(11) 84-86 2012.*
Kowalski et al. Micropropagation of Podocarpus henlelii and P. elongatus South African Journal of Botany 67 362-366 2001.*
Khaldun et al. Comparative Profiling of miRNAs and Target Gene Identification in Distant-Grafting between Tomato and Lycium Frontiers in Plant Science Oct. 2016.*
Woody Plant Medium Product Information Plantigen Himedia 2017.*
Mavi et al.The effect of Priming on Tomato Rootstock seeds in relation to seddling growth Asian Journal of Plant Sciences 5 (6) 940-947 2006.*
International Search Report (PCT/CN2019/103658); dated Jan. 10, 2020.

* cited by examiner

*Primary Examiner* — Keith O. Robinson
(74) *Attorney, Agent, or Firm* — W&G Law Group

(57) ABSTRACT

The present application discloses a woody rootstock for efficient grafting of solanaceous vegetables and an efficient grafting and seedling culture method thereof. According to the present application, a woody rootstock clone with high consistency is provided through tissue culture, efficient grafting is completed through sleeve grafting technology, and the grafting survival rate is improved by regulating the healing environment. A new idea for efficient industrial grafting of solanaceous vegetables is provided, scions are imparted with new features through distant grafting, and the problems of low grafting efficiency and low survival rate are solved. The method has the advantages of strong operability, simplicity, high efficiency and low cost, and provides a technical support for the industrial production of grafted seedlings of solanaceous vegetables.

8 Claims, 1 Drawing Sheet

WOODY ROOTSTOCK FOR EFFICIENT GRAFTING OF SOLANACEOUS VEGETABLES AND EFFICIENT GRAFTING AND SEEDLING CULTURE METHOD THEREOF

TECHNICAL FIELD

The present application relates to a woody rootstock for efficient grafting of solanaceous vegetables and methods of efficient grafting and seedling culture thereof. The rootstock clone is established by tissue culture technology, which was used for sleeving grafting, so that grafted seedlings of solanaceous vegetables with a high survival rate and a low cost can be quickly obtained.

BACKGROUND

Solanaceous vegetables are of important economic value. For example, tomato is one of the most important fruit vegetables in the world, which is widely cultivated in various countries around the world. In recent years, low temperature, soil-borne diseases and continuous cropping obstacles have become the main problems affecting the yield and quality of solanaceous vegetables. At present, the above problems are mainly solved by interspecific or intergeneric grafting in the practical production. For example, eggplant and tomato have improved their resistance to verticillium wilt, fusarium wilt, bacterial wilt and root-knot nematode disease to a certain extent by grafting on a special rootstock named Torubam. However, due to the problems of lacking low temperature tolerance and resistant germplasm resources, it is very important to graft solanaceous vegetables by using rootstocks with high resistance and low temperature tolerance. *Lycium* belong to Solanaceae, and has high resistance to low temperature. Meanwhile, it also has high nutritional value. The polysaccharide richly in *Lycium* has the functions of regulating immunity, delaying aging, etc. In addition, *Lycium ruthenicum* Murr. is the plant with the most anthocyanins found at present. Therefore, grafting solanaceous vegetables with *Lycium* as rootstock can not only increase the low temperature resistance of solanaceous vegetables, but also prolong the growing season of Solanaceae vegetables and improve the nutritional quality of fruits.

However, it is difficult to graft herbaceous solanaceous vegetables by using a woody *Lycium* plant as a rootstock. Studies have shown that although there are reports of successful grafting, there are some problems such as a low grafting survival rate and a low yield of grafted seedlings, which makes it difficult to popularization and application. Therefore, developing a woody rootstock for efficient grafting of solanaceous vegetables and efficient grafting method thereof have important basic theoretical significance and application value.

SUMMARY

The purpose of the present application is to provide a woody rootstock for efficient grafting of solanaceous vegetables and an efficient grafting and seedling culture method thereof for distant grafting.

The purpose of the present application is achieved by the following technical solution: the rootstock for efficient grafting of solanaceous vegetables is obtained by the following steps:

(1) taking newly induced branches and sterilizing;
(2) cutting the branches into small stems, inoculating into a bud induction culture medium for bud induction germination;
(3) when the newly induced buds grow to 5 cm or more, cutting the buds into small stems, which are inoculated into a bud subculture propagation medium to establish a rootstock clone;
(4) when the newly induced buds on the small stems grow to 3 cm or more, cutting at lower end horizontally, and inoculating into a rooting culture medium to support the buds grow into a complete plant;
(5) transplanting the complete plant into matrix for domestication; and
(6) cutting off top end of the plant horizontally, removing leaves in an area of 2 cm below the flat cut, splitting the cut by 0.5 cm-0.8 cm to form a split, and sleeving the split, thus obtaining the rootstock which can be used for efficiently grafting solanaceous vegetables.

A method for efficiently grafting and seedling culture of solanaceous vegetables, which achieves based on the above rootstock, specifically includes:

(a) accelerating germination and sowing scion seeds;
(b) after the scion seeds grow into seedlings, taking a portion above cotyledon and cutting lower section into a wedge shape on both sides, and inserting the lower section into the split of a rootstock, and adjusting a position of sleeve to fix scion on the rootstock; and
(c) planting the grafted seedlings into matrix and proceeding to cultivation management.

Furthermore, in the step (1), growing a newly sprouted branches to a length of 5 cm-15 cm.

Furthermore, in the step (1), rinsing the branches with clean running water for 2 h and placing on an ultra-clean workbench, soaking and washing with a 75% ethanol aqueous solution for 30 s, rinsing with sterile water for 2-3 times each for 1 min; soaking and washing with a 1 wt % mercuric chloride aqueous solution for 5 min, rinsing with sterile water for 3-5 times each for 1 min; and absorbing residual water by sterile filter paper.

Furthermore, in the step (2), in the bud induction culture medium, WPM (Woody Plant Medium) is used as the basic medium, and sucrose, agar, 6-BA and NAA are added with concentrations of 30 g/L, 8 g/L, 1.0 mg/L and 0.5 mg/L respectively; the pH value of the bud induction culture medium is 5.8; cutting the branch into a small stem with an axillary bud, and inoculating into the bud induction medium, and culturing in an environment at 25° C. under a 12 h/12 h light/dark photoperiod with a light intensity of 4000 lux.

Furthermore, in the step (3), when the axillary bud grows to have a length of 5 cm or more and a stem diameter of 2 mm-3 mm, cutting it into small stems with an axillary bud, which inoculating into the bud subculture propagation medium for propagation culture in an environment at 25° C. under a 12 h/12 h light/dark photoperiod with a light intensity of 4000 lux to establish a rootstock clone. WPM and MS in a volume ratio of 1:1 are used as basic culture medium of the bud subculture propagation medium, sucrose and agar are added with the concentrations of 30 g/L and 8 g/L respectively, and the pH value of the bud subculture propagation medium is 5.8.

Furthermore, in the step (4), when the small stems grow to 3 cm or more, cutting at base and inoculating into a rooting culture medium, wherein in the rooting culture medium, WPM and MS in a volume ratio of 1:1 are used as a basic culture medium, sucrose, agar, IBA and NAA are added with the concentrations of 30 g/L, 8 g/L, 0.4 mg/L and 0.05 mg/L, respectively, and the pH value of the rooting culture medium is 5.8.

Furthermore, in the step (5), moving a complete plant into a hole tray filled with wet matrix, and culturing in an environment at 95% relative humidity at 25° C./18° C. under a 16 h/8 h light/dark photoperiod with a light intensity of 8000 lux.

Furthermore, in the step (a), the germination accelerating process comprises: soaking seeds in warm water of 55° C. for 1 h, naturally cooling, placing the seeds in a culture dish covered with clean and moist filter paper, and culturing at 25° C. without illumination; the sowing process comprises: taking out seeds at beginning of germination and transferring them to a hole tray filled with wet matrix, culturing in an environment at 80% relative humidity at 25° C./18° C. under a 16 h/8 h light/dark photoperiod with a light intensity of 8000 lux.

Furthermore, in the step (b), grafting the scion when it growing to have three complete leaves and one young leaf, and culturing in an environment at 95% relative humidity at 25° C./18° C. under a 16 h/8 h light/dark photoperiod with a light intensity of 8000 lux.

Furthermore, in the step (c), gradually reducing the humidity to 60% after planting for 1-2 weeks.

The method provided by the present application has the advantages that consistent rootstock clones are provided through tissue culture. Grafting is efficiently completed through sleeve grafting technology, and the healing environment is regulated and controlled to improve the survival rate. The present application can provide a new idea for efficient industrial grafting of solanaceous vegetables, impart scions with new features through distant grafting, and solve the problems of low grafting efficiency and low survival rate. Rootstocks with high consistency for grafting can be produced quickly all the year round, thus ensuring the consistency of grafted seedlings to a certain extent. Grafting with sleeves can improve grafting efficiency, and one grafted seedling can be produced in 10 s when the operation is skillful, and the survival rate can be improved. The achievement of the present application is not only suitable for grafting *Lycium* and tomato, but also can be applied to other solanaceous vegetables.

DESCRIPTION OF EMBODIMENTS

The present application will be further explained with examples below.

Example 1

Figure 1:
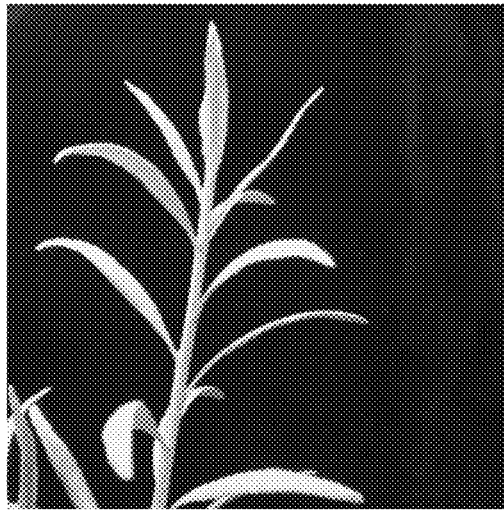
FIG. 1 is a branch of *Lycium ruthenicum* Murr.

Materials: in this example, *Lycium ruthenicum* Murr. and cherry tomato were taken as examples.
Step (1): Collecting Materials
A newly sprouted branch with 10 cm (FIG. 1) from perennial *Lycium ruthenicum* Murr. was taken in spring, which was green in color, strong and flexible.

Step (2): Disinfection and Sterilization of the Surface of Branch
The branch was rinsed in clean running water for 2 h, soaked in a 75% ethanol aqueous solution for 30 s on an ultra-clean bench, and rinsed with sterile water for 3 times; after being treated with a 0.1 wt % mercuric chloride aqueous solution for 5 min, the branch was rinsed with sterile water for 5 times and the surface moisture was absorbed with sterile filter paper.

(3) Primary Culture and Subculture of *Lycium Ruthenicum* Murr.
The sterilized branch was put in a culture dish covered with sterilized filter paper; the branch was fixed with sterile tweezers in the left hand, and cut into small stems with an axillary bud of about 1 cm with sterile scalpel in the right hand, and the stems were inoculated into a bud induction medium (WPM (Woody Plant Medium) was used as a basic medium, and sucrose, agar, 6-BA, and NAA were added with the concentrations of 30 g/L, 8 g/L, 1.0 mg/L and 0.5 mg/L respectively, and the pH value of the medium was 5.8); when the axillary buds grew to have a length of 5 cm and a stem diameter of 2 mm-3 mm, they were inoculated into the bud subculture propagation medium by the same operation (WPM and MS were used as the basic culture medium according to the volume ratio of 1:1, and sucrose and agar were added with concentrations of 30 g/L and 8 g/L respectively, and the pH value of the medium was 5.8); they were cultured in the environment at 25° C. under a 12 h/12 h light/dark photoperiod with a light intensity of 4000 lux.

Figure 2:
FIG. 2 is a tissue culture seedling of *Lycium ruthenicum* Murr.

(4) Rooting Culture of *Lycium Ruthenicum* Murr.
When the newly grown buds grew to 3 cm (FIG. 2), they were inoculated into a rooting culture medium (WPM and MS were used as a basic medium according to the volume ratio of 1:1, and sucrose, agar, IBA and NAA were added with the concentrations of 30 g/L, 8 g/L, 0.4 mg/L and 0.05 mg/L respectively, and the pH value of the medium was 5.8); the buds were cultured in the environment at 25° C. under a 12 h/12 h light/dark photoperiod with a light intensity of 4000 lux.

(5) Domesticating the Tissue Culture Seedlings of *Lycium Ruthenicum* Murr.
After the completed plant inoculated into rooting culture medium took root, it was taken out of the tissue culture bottle, moved to a hole tray filled with wet matrix, and cultured in an environment at 95% relative humidity at 25° C./18° C. under a 16 h/8 h light/dark photoperiod with a light intensity of 8000 lux.

(6) Accelerating Germination and Sowing Cherry Tomato Seeds
Cherry tomato seeds were soaked in warm water of 55° C. for 1 h, and then naturally cooled; the seeds were put in a culture dish covered with clean and moist filter paper, and cultivated at 25° C. without illumination; when they began to germination, they were sowed in a hole tray filled with wet matrix and kept the condition at 80% relative humidity at 25° C./18° C. under a 16 h/8 h light/dark photoperiod with a light intensity of 8000 lux.

Figure 3:
FIG. 3 is a cherry tomato to be grafted.

(7) Grafting
When the cherry tomato grew to have three complete leaves and one young leaf (FIG. 3), the portion above the cotyledon was cut, and the lower end was cut into a wedge shape on both sides in 15°; the top end of *Lycium ruthenicum* Murr. was cut off horizontally, the leaves in an area of 2 cm below were removed and sleeved; a split of 0.8 cm was cut out longitudinally so that the wedge-shaped lower end of cherry tomato was inserted into the split of *Lycium ruthenicum* Murr., and the sleeve was adjusted.

Step (8): Healing of Grafted Seedlings

Figure 4:
FIG. 4 is the healing site after grafted for several months.

The grafted seedlings were cultured in the environment at 95% relative humidity at 25° C./18° C. under a 16 h/8 h light/dark photoperiod with a light intensity of 8000 lux. After 1 week-2 weeks, the growth trend was obviously accelerated, and the humidity was gradually reduced to 60%. After the production of grafted seedlings was completed, the grafted seedlings could be normal cultivated, and the grafted parts healed well (FIG. 4), and blossomed at normal nodes.

Example 2

Materials: in this example, *Lycium* barbarum and cherry pepper were taken as examples.

Step (1): Collecting Materials

A newly sprouted branch with 15 cm from perennial *Lycium* barbarum was taken in spring, which was green in color, strong and flexible.

Step (2): Disinfection and Sterilization of the Surface of Branch

The branch was rinsed in clean running water for 2 h, soaked in a 75% ethanol aqueous solution for 30 s on an ultra-clean bench, and rinsed with sterile water for 3 times; after being treated with a 0.1 wt % mercuric chloride aqueous solution for 5 min, the branch was rinsed with sterile water for 5 times and the surface moisture was absorbed with sterile filter paper.

(3) Primary Culture and Subculture of *Lycium* Barbarum

The sterilized branch was put in a culture dish covered with sterilized filter paper; the branch was fixed with sterile tweezers in the left hand, and cut into small stems with an axillary bud of about 2 cm with sterile scalpel in the right hand, and the stems were inoculated into a bud induction medium (WPM (Woody Plant Medium) was used as a basic medium, and sucrose, agar, 6-BA, and NAA were added with the concentrations of 30 g/L, 8 g/L, 1.0 mg/L and 0.5 mg/L respectively, and the pH value of the medium was 5.8); when the axillary buds grew to have a length of 8 cm and a stem diameter of 3 mm-4 mm, they were inoculated into the bud subculture propagation medium by the same operation (WPM and MS were used as the basic culture medium according to the volume ratio of 1:1, and sucrose and agar were added with concentrations of 30 g/L and 8 g/L respectively, and the pH value of the medium was 5.8); they were cultured in the environment at 25° C. under a 12 h/12 h light/dark photoperiod with a light intensity of 4000 lux.

(4) Rooting Culture of *Lycium* Barbarum

When the newly grown buds grew to 5 cm, they were inoculated into a rooting culture medium (WPM and MS were used as a basic medium according to the volume ratio of 1:1, and sucrose, agar, IBA and NAA were added with the concentrations of 30 g/L, 8 g/L, 0.4 mg/L and 0.05 mg/L respectively, and the pH value of the medium was 5.8); the buds were cultured in the environment at 25° C. under a 12 h/12 h light/dark photoperiod with a light intensity of 4000 lux.

(5) Domesticating the Tissue Culture Seedlings of *Lycium* Barbarum

After the completed plant inoculated into rooting culture medium took root, it was taken out of the tissue culture bottle, moved to a hole tray filled with wet matrix, and cultured in an environment at 95% relative humidity at 25° C./18° C. under a 16 h/8 h light/dark photoperiod with a light intensity of 8000 lux.

(6) Accelerating Germination and Sowing Cherry Pepper Seeds

Cherry pepper seeds were soaked in warm water of 55° C. for 1 h, and then naturally cooled; the seeds were put in a culture dish covered with clean and moist filter paper, and cultivated at 25° C. without illumination; when they began to germination, they were sowed in a hole tray filled with wet matrix and kept the condition at 80% relative humidity at 25° C./18° C. under a 16 h/8 h light/dark photoperiod with a light intensity of 8000 lux.

(7) Grafting

When the cherry pepper grew to have three complete leaves and one young leaf, the portion above the cotyledon was cut, and the lower end was cut into a wedge shape on both sides in 15°; the top end of Lyciuni barbarum was cut off horizontally, the leaves in an area of 2 cm below were removed and sleeved; a split of 0.8 cm was cut out longitudinally so that the wedge-shaped lower end of cherry pepper was inserted into the split of Lyciuin barbarum, and the sleeve was adjusted.

Step (8): Healing of grafted seedlings The grafted seedlings were cultured in the environment at 95% relative humidity at 25° C./18° C. under a 16 h/8 h light/dark photoperiod with a light intensity of 8000 lux. After 1 week-2 weeks, the growth trend was obviously accelerated, and the humidity was gradually reduced to 60%. After the production of grafted seedlings was completed, the grafted seedlings could be normal cultivated, and the grafted parts healed well, and blossomed at normal nodes.

What is claimed is:

1. A method for efficiently grafting and seedling culture of solanaceous vegetables, comprising:
   (a) accelerating germination and sowing scion seeds of solanaceous vegetables;
   (b) after the scion seeds grow into seedlings, taking a portion above cotyledon and cutting lower section into a wedge shape on both sides, and inserting the lower section into a split of a rootstock, and adjusting a position of sleeve to fix scion on the rootstock; and
   (c) planting the grafted seedlings into matrix and proceeding to cultivation management, wherein the rootstock is obtained by:
   (1) taking newly induced branches of *Lycium barbarum* or *Lycium ruthenicum* Murr. and sterilizing;
   (2) cutting the branches into small stems, inoculating into a bud induction culture medium for bud induction germination, wherein in the bud induction culture medium, WPM (Woody Plant Medium) is used as the basic medium, and sucrose, agar, 6-BA, and NAA are added with concentrations of 30 g/L, 8 g/L, 1.0 mg/L and 0.5 mg/L respectively; the pH value of the bud induction culture medium is 5.8; cutting the branch into a small stem with an axillary bud, and inoculating into the bud induction medium, and culturing in an environment at 25° C. under a 12 h/12 h light/dark photoperiod with a light intensity of 4000 lux;
   (3) when the newly induced buds grow to 5 cm or more, cutting the buds into small stems, which are inoculated into a bud subculture propagation medium to establish a rootstock clone, wherein in the bud subculture propagation medium, WPM and MS in a volume ratio of 1:1 are used as a basic culture medium, sucrose and agar are added with the concentrations of 30 g/L and 8 g/L respectively, and the pH value of the bud subculture propagation medium is 5.8;
   (4) when the newly induced buds on the small stems grow to 3 cm or more, cutting at lower end horizontally, and inoculating into a rooting culture medium to make the buds grow into a complete plant, wherein in the rooting culture medium, a culture medium consisting of WPM and MS in a volume ratio of 1:1 are used as a basic culture medium, and sucrose, agar, IBA, NAA are added with the concentrations of 30 g/L, 8 g/L, 0.4 mg/L and 0.05 mg/L, respectively, and the pH value of the rooting culture medium is 5.8;

(5) transplanting the complete plant into matrix for domestication; and (6) cutting off top end of the plant horizontally, removing leaves in an area of 2 cm below the flat cut, splitting the cut by 0.5 cm-0.8 cm to form a split, and sleeving the split, thus obtaining the rootstock which can be used for efficiently grafting solanaceous vegetables.

2. The method according to claim 1, wherein in the step (1), growing a newly sprouted branches to a length of 5 cm-15 cm.

3. The method according to claim 1, wherein in the step (1), rinsing the branches with clean running water for 2 h and placing on an ultra-clean workbench, soaking and washing with a 75% ethanol aqueous solution for 30 s, rinsing with sterile water for 2-3 times each for 1 min; soaking and washing with a 0.1 wt % mercuric chloride aqueous solution for 5 min, rinsing with sterile water for 3-5 times each for 1 min; and absorbing residual water by sterile filter paper.

4. The method according to claim 1, wherein in the step (3), when the axillary bud grows to have a length of 5 cm or more and a stem diameter of 2 mm-3 mm, cutting it into small stems with an axillary bud, which inoculating into the bud subculture propagation medium for propagation culture in an environment at 25° C. under a 12 h/12 h light/dark photoperiod with a light intensity of 4000 lux to establish a rootstock clone.

5. The method according to claim 1, wherein in the step (5), moving a complete plant into a hole tray filled with wet matrix, and culturing in an environment at 95% relative humidity at 25° C./18° C. under a 16 h/8 h light/dark photoperiod with a light intensity of 8000 lux.

6. The method according to claim 1, wherein in the step (a), the germination accelerating process comprises: soaking seeds in warm water of 55° C. for 1 h, naturally cooling, placing the seeds in a culture dish covered with clean and moist filter paper, and culturing at 25° C. without illumination; the sowing process comprises: taking out seeds at beginning of germination and transferring them to a hole tray filled with wet matrix, culturing in an environment at 80% relative humidity at 25° C./18° C. under a 16 h/8 h light/dark photoperiod with a light intensity of 8000 lux.

7. The method according to claim 1, wherein in the step (b), grafting the scion when it growing to have three complete leaves and one young leaf, and culturing in an environment at 95% relative humidity at 25° C./18° C. under a 16 h/8 h light/dark photoperiod with a light intensity of 8000 lux.

8. The method according to claim 1, wherein in the step (c), gradually reducing the humidity to 60% after planting for 1 week-2 weeks.

* * * * *